United States Patent [19]

Meltzer

[11] 3,880,863
[45] Apr. 29, 1975

[54] 17-ARALKYL-6 BETA-AZIDO-4,5 ALPHA-EPOXYMORPHINAN-3-OLS

[75] Inventor: Robert I. Meltzer, Rockaway, N.J.

[73] Assignee: Warner-Lambert Company, Morris Plains, N.J.

[22] Filed: Aug. 31, 1973

[21] Appl. No.: 393,378

[52] U.S. Cl.................................. 260/285; 424/260
[51] Int. Cl.²............................................ C07D 43/28
[58] Field of Search.................................... 260/285

[56] References Cited
UNITED STATES PATENTS
3,318,885   5/1967   Brown et al. ...................... 260/285

OTHER PUBLICATIONS
Bognar et al., Chemical Abstracts, Vol. 71, 13243x, 1969.
Bognar et al., Chemical Abstracts, Vol. 71, 3515y, 1969.

*Primary Examiner*—Donald G. Daus
*Assistant Examiner*—Mary Vaughn
*Attorney, Agent, or Firm*—Albert H. Graddis; Frank S. Chow

[57] ABSTRACT

The present invention relates to novel 17-aralkyl-6β-azido-4,5α-epoxymorphinan-3-0ls having the following structural formula:

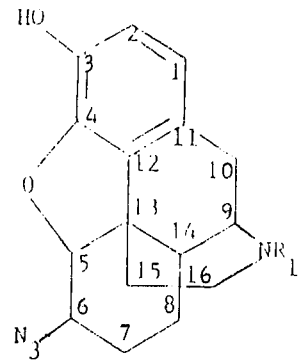

in which $R_1$ is phenyl lower alkyl such as, for example, phenethyl. These compounds are useful as analgesics and antitussive agents.

2 Claims, No Drawings

17-ARALKYL-6-BETA-AZIDO-4,5 ALPHA-EPOX-YMORPHINAN-3-OL<sup>S</sup>

The present invention relates to novel morphine derivatives and, more particularly, the present invention relates to 17-aralkyl-6β-azido-4,5α-epoxymorphinan-3-ols having the following structural formula:

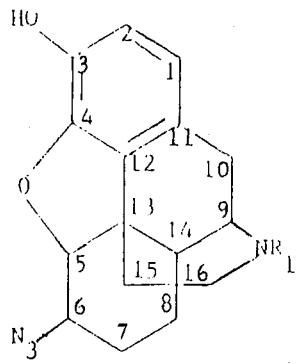

wherein $R_1$ is phenyl lower alkyl in which "lower alkyl" has 1 to 7 carbon atoms.

The present invention also includes within its scope pharmaceutically acceptable acid addition salts of these novel azidomorphine derivatives.

The compounds of this invention are useful as analgesics and antitussive agents. They are administered parenterally or orally for the management of pain in any of the usual pharmaceutical forms including tablets, capsules, powders, suspensions, solutions, syrups and the like. Particularly valuable formulations include sustained release preparations which may be compounded by any of the known procedures. Generally these compounds are effective in effecting analgesia at a dosage of from about 0.1 to about 0.5 mg. per kg. of body weight. As with any analgesic agent, the dosage should be adjusted to the severity of the indication and the degree of response. Moreover the dose may be repeated as appropriate depending upon the nature of the particular formulation, the response and the condition of the patient.

According to the present invention the above compounds are prepared by acylating 4,5α-epoxy-morphinan-3,6α-diol, e.g., with phenyl alkanoyl chloride. The 17-acylated product is reduced with a complex metal hydride to obtain 4,5α-epoxy-17-$R_1$-3,6α-diol. This is reacted with tosylchloride or mesylchloride to give, e.g. 4,5α-epoxy-3,6α-ditosyloxy-17-$R_1$-morphinan, followed by treatment with sodium azide to yield 6β-azido-4,5α-17-$R_1$-3-tosyloxymorphinan. The compounds of this invention are obtained by alkaline hydrolysis of the latter product.

The starting material is disclosed in Ber., 49, 750 (1916).

A further embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, malic, maleic, aconitic, phthalic, tartaric, embonic and like acids.

In order to further illustrate the practice of this invention, the following examples are included:

EXAMPLE 1

Preparation of 4,5α-Epoxy-17-phenacetylmorphinan-3,6α-diol

To a suspension of 18 g 4,5α-epoxymorphinan-3,6α-diol* in 330 ml methanol and 125 ml water is added 33.3 g of potassium carbonate. This is followed by 32.2 g of phenylacetyl chloride which is added over a 10 minute period, maintaining a temperature of about 25°C. The resulting mixture is stirred an additional 3 hours, diluted with 2 l. water and extracted with three 1 l. portions of ethyl acetate. The combined extracts are washed with two 200 ml portions of 1.67 N hydrochloric acid followed by 200 ml of water, dried, filtered and the solvent evaporated. Tetrahydrofuran is added and the solvent is again evaporated. The resulting residue is reduced without further purification as described in example 2.

*This product is disclosed in Von Braun and Kindler Ber., 49, 750 (1916).

EXAMPLE 2

Preparation of 4,5α-Epoxy-17-phenethylmorphinan-3,6α-diol

To 25.7 g of crude 4,5α-epoxy-17-phenacetylmorphinan-3,6α-diol is added 150 ml of ether. A solution of lithium aluminum hydride in 300 ml ether is added cautiously and the mixture is refluxed for 16 hours. The reaction mixture is chilled and 750 ml of 17% hydrobromic acid are slowly added. The gum formed is isolated by decanting, filtering, mixing with methanol, and refiltering. Concentrated ammonia is added until precipitation is complete. The product is filtered and dried to give 14.5 g melting at 231°–231.5°C.

EXAMPLE 3

Preparation of 4,5α-Epoxy-3,6α-ditosyloxy-17-phenethylmorphinan

To 3.77 g of 4,5α-epoxy-17-phenethylmorphinan-3,6α-diol is added 30 ml pyridine. To this solution is then added 4.19 g of tosyl chloride in 30 ml pyridine over a 10 minute period. The temperature is maintained at 0°C during the addition and for a further 2 hours, then brought to 25°C for 16 hours. The solvent is removed under vacuum and the residue slurried in a mixture of ether, water and sodium bicarbonate until dissolved. The layers are separated and the water extracted with fresh ether. The combined ether extracts are washed with water, dried over magnesium sulfate, and evaporated to a residue of 5.5 g of an oil. This crude material is used as is in the reaction with sodium azide described in Example 4.

EXAMPLE 4

Preparation of 6β-Azido-4,5α-epoxy-17-phenethyl-3-tosyloxymorphinan

The 5.5 g of crude 4,5α-epoxy-3,6α-ditosyloxy-17-phenethylmorphinan are stirred with 120 ml of dimethylformamide, 8.06 g of sodium azide, and 19 ml of water and heated at 100°C for 16 hours. After cooling, it is poured into water and extracted with four 400 ml portions of ether. The combined ether extracts are washed with water, dried and evaporated to give 4.0 g of a crude oily residue.

EXAMPLE 5

Preparation of 6β-Azido-4,5α-epoxy-17-phenethylmorphinan-3-ol

To 4 g. of crude 6β-azido-4,5α-epoxy-17-phenethyl-3-tosyloxymorphinan obtained in example 4 are added 50 ml of ethanol containing 3 ml of 50% sodium hydroxide solution. The reaction is then heated 20 minutes on a steam bath. The alcohol is removed and 50 ml of water is added. Saturated sodium bicarbonate is then added until precipitation is complete. The reaction is filtered, the solids shaken in 75 ml ether, refiltered and the ether evaporated. The residue is recrystallized from 20 ml ether, giving 0.9 g. of solid showing two major compounds on a silica gel thin layer chromatography plate. The more rapidly migrating component is isolated by column chromatography on silica gel using methanol-benzene as an eluent. One recrystallization from ether gives 300 mg. of the above named compound, melting at 139°–142°C. There is a strong infrared band at 2090 cm$^{-1}$. $[\alpha]_{589}^{25} = -170.4°C.$ ($C=1$ in DMF)

Calcd: C, 71.62; H, 6.51; N, 13.92.
Found: C, 71.09; H, 6.92; N, 14.03.

I claim:
1. A compound of the formula:

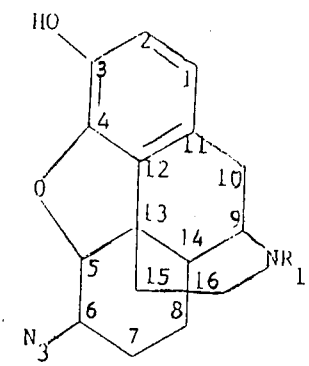

wherein $R_1$ is phenyl lower alkyl in which the lower alkyl portion has 1 to 7 carbon atoms and the pharmaceutically acceptable acid addition salts thereof.

2. A compound according to claim 1 wherein said phenyl lower alkyl is phenethyl.

* * * * *